(12) United States Patent
Ottoni Candido Filho et al.

(10) Patent No.: US 11,407,194 B2
(45) Date of Patent: Aug. 9, 2022

(54) COMPOSITE, PROCESS FOR THE PRODUCTION THEREOF, USE OF SAID MATERIAL AND ARTICLES COMPRISING THE SAID MATERIAL

(71) Applicants: André Gustavo Ottoni Candido Filho, Rio de Janeiro (BR); César Diógenes de Carvalho, Rio de Janeiro (BR)

(72) Inventors: André Gustavo Ottoni Candido Filho, Rio de Janeiro (BR); César Diógenes de Carvalho, Rio de Janeiro (BR)

( * ) Notice: Subject to any disclaimer, the term of this patent is extended or adjusted under 35 U.S.C. 154(b) by 0 days.

(21) Appl. No.: 16/765,069

(22) PCT Filed: Nov. 14, 2018

(86) PCT No.: PCT/BR2018/050427
§ 371 (c)(1),
(2) Date: May 18, 2020

(87) PCT Pub. No.: WO2019/095029
PCT Pub. Date: May 23, 2019

(65) Prior Publication Data
US 2020/0353711 A1   Nov. 12, 2020

(30) Foreign Application Priority Data

Nov. 16, 2017   (BR) .................. 10 2017 024629 9
Sep. 25, 2018   (BR) .................. 10 2018 069607 6

(51) Int. Cl.
| | |
|---|---|
| B32B 1/08 | (2006.01) |
| B32B 27/32 | (2006.01) |
| B32B 27/12 | (2006.01) |
| B32B 27/08 | (2006.01) |
| C08J 5/18 | (2006.01) |
| C08J 5/24 | (2006.01) |
| F16L 9/12 | (2006.01) |
| F16L 9/14 | (2006.01) |
| F16S 3/02 | (2006.01) |
| F16J 12/00 | (2006.01) |
| F17C 1/06 | (2006.01) |
| B29C 41/04 | (2006.01) |
| B29K 23/00 | (2006.01) |
| B29L 23/00 | (2006.01) |

(52) U.S. Cl.
CPC ............ *B32B 1/08* (2013.01); *B32B 27/08* (2013.01); *B32B 27/12* (2013.01); *B32B 27/322* (2013.01); *C08J 5/18* (2013.01); *C08J 5/24* (2013.01); *F16J 12/00* (2013.01); *F16L 9/12* (2013.01); *F16L 9/14* (2013.01); *F16S 3/02* (2013.01); *F17C 1/06* (2013.01); *B29C 41/04* (2013.01); *B29K 2023/065* (2013.01); *B29L 2023/22* (2013.01); *B32B 2250/04* (2013.01); *B32B 2260/021* (2013.01); *B32B 2260/046* (2013.01); *B32B 2262/101* (2013.01); *B32B 2262/106* (2013.01); *B32B 2264/1051* (2020.08); *B32B 2439/40* (2013.01); *C08J 2323/06* (2013.01); *C08J 2327/18* (2013.01); *C08J 2363/00* (2013.01); *C08J 2477/06* (2013.01)

(58) Field of Classification Search
CPC ......... B32B 1/00; B32B 1/08; B32B 2250/04; B32B 2260/021; B32B 2260/046; B32B 2262/101; B32B 2262/106; B32B 2264/1051; B32B 2439/40; B32B 27/08; B32B 27/12; B32B 27/322; B32B 37/10; B32B 37/12; B32B 38/00; F16J 12/00; F16S 3/02; B29C 35/04; B29C 41/04; B29C 49/22; B29C 53/56; C08J 2323/06; C08J 2327/18; C08J 2363/00; C08J 2477/06; C08J 5/18; C08J 5/24; F16L 9/12; F16L 9/14; F17C 1/06; B29K 2023/065; B29L 2023/22
See application file for complete search history.

(56) References Cited

U.S. PATENT DOCUMENTS

| | | | |
|---|---|---|---|
| 4,741,880 | A | 5/1988 | Lang |
| 5,133,928 | A | 7/1992 | Oldfield |
| 5,653,358 | A | 8/1997 | Sneddon |
| 6,425,172 | B1 | 7/2002 | Rutz |
| 6,651,307 | B2 | 11/2003 | Portmann |

(Continued)

FOREIGN PATENT DOCUMENTS

| | | |
|---|---|---|
| BR | 8505498 A | 12/1986 |
| CN | 2292965 Y | 9/1998 |

(Continued)

*Primary Examiner* — Yan Lan
(74) *Attorney, Agent, or Firm* — Hogan Lovells US LLP

(57) ABSTRACT

The present invention refers to a composite material that comprises carbon fiber or sheet made from polyacrylonitrile (PAN) or lignin being indicated for the manufacture of several articles such as high resistance pressure cylinder. Said material presents several advantages such as, for example, to provide improved screening to the articles that comprise it.

The referred composite comprises:
- a first inner layer of polytetrafluorethylene, covered by
- a second layer of high-density polyethylene, adhered to
- a third layer of composite containing carbon fiber or sheet made from polyacrylonitrile (PAN) or lignin immersed in cured epoxy resin from a polymeric matrix and a hardener; and
- a fourth outer layer of composite, comprising aramid fiber impregnated with a dilating fluid and cured epoxy resin from a polymeric matrix and a hardener.

8 Claims, No Drawings

(56) References Cited

U.S. PATENT DOCUMENTS

| | | | |
|---|---|---|---|
| 7,238,402 B2 * | 7/2007 | Swales | B32B 5/16 |
| | | | 428/292.1 |
| 2002/0155232 A1 | 10/2002 | Delay | |
| 2013/0276961 A1 | 10/2013 | Sneddon | |
| 2013/0313266 A1 * | 11/2013 | Andernach | F17C 1/06 |
| | | | 220/590 |

FOREIGN PATENT DOCUMENTS

| | | |
|---|---|---|
| EP | 1067300 | 4/2005 |
| EP | 1906071 | 4/2008 |
| JP | 6065957 A | 4/1985 |
| JP | 6378705 A | 4/1988 |
| WO | 01/96766 | 12/2001 |
| WO | 2013/006900 | 1/2013 |

* cited by examiner

COMPOSITE, PROCESS FOR THE PRODUCTION THEREOF, USE OF SAID MATERIAL AND ARTICLES COMPRISING THE SAID MATERIAL

CROSS REFERENCE TO RELATED APPLICATIONS

This application is a 35 U.S.C. 371 National Stage of International Application No. PCT/BR2018/050427, titled "COMPOSITE, PROCESS FOR THE PRODUCTION THEREOF, USE OF THE SAID MATERIAL AND ARTICLES COMPRISING THE SAID MATERIAL", filed Nov. 14, 2018, which claims priority to BR Application No. 10 2017 024629 9, filed Nov. 16, 2017, and BR Application No. 10 2018 069607 6, filed Sep. 25, 2018, all of which are incorporated by reference herein in their entirety.

FIELD OF THE INVENTION

The present invention refers to a composite material that comprises, among other raw materials, carbon or polyacrylonitrile (PAN) fiber or sheet or lignin being indicated for the manufacture of several articles among which pressure cylinders and, more particularly, a pressure cylinder highly resistant for storing gaseous fluids. Said material presents several advantages over the currently known materials such as, for example, to provide improved screening to the articles that comprise it.

The present invention further refers to a process for the production of the referred composite material and the use of these for the preparation of several articles that require, among other characteristics, high resistance, and screening capacity.

STATE OF THE ART

The pressure cylinders were initially manufactured from metallic materials, such as steel to reinforce high yield stress, fracture strength, good mechanical resistance, and good corrosion resistance, as described, for example, in the patent documents U.S. Pat. Nos. 4,741,880 and 5,133,928. However, these types of cylinders, manufactured in metallic materials, although they have higher resistance capacity to pressure, present deficiencies as regards their weldability and fracture strength, apart from being adversely heavy.

Subsequently, pressure cylinders produced by aluminum alloy with the purpose of eliminating the weight disadvantage. However, in spite of the efforts in developing a less heavy cylinder consisting solely of metal, such as aluminum, there was still the need to develop alloys with sufficient resistance to support the pressure of the gas compressed against the cylinder walls, particularly in the extremities which are made with even lighter material. Thus, the cylinders made by composites appeared, which as a rule, are obtained from structural fibers in the form of continuous filaments, woven or chopped, which were impregnated or coated by a matrix which may be metallic, ceramic or thermoplastic polymeric, thermo rigid or elastomeric. Examples of pressure cylinders or flasks made from composite materials may be found in the patents U.S. Pat. Nos. 6,651,307 and 6,425,172.

As per the current technology, for the manufacture of gas cylinders, it is usual to use structural fibers, such as glass, carbon, and aramid fibers. However, for more specific applications, there exist other fibers, such as the boron-tungsten, alumina, silicon carbide, among others, which may be used for presenting excellent mechanical properties in temperatures of up to 2.000° C.

Considering that the cylinders for storage of gases of the prior art were originally projected for use in aero spatial applications, common situations that apply to other uses, such as damages caused by impacts and external collisions that could eventually hit and damage the cylinder, were not taken into consideration.

When developing and projecting a cylinder for the transport and storage of gases, it is important to consider that, more and more, the gas cylinders have more urban applications. The cylinders for gases came to be routinely used in vehicles such as, cars and trucks, that constantly circulate in urban areas, differently from the initially projected use which was normally in closed applications, in controlled and monitored environments, and in industries, such as in fuel deposits for aerospace vehicles or vessels.

Therefore, there exists increasingly the need to avail of a safer cylinder for gases and which meets all the above cited requirements, such as, for example, be of a light weight, have extremely high mechanical resistance to accommodate fluids and still present characteristics of low permeability among the means selected for the manufacture of the cylinder and the fluids therein contained, apart from presenting an improved screening capacity.

The high resistance pressure cylinders for storing gaseous fluids with improved screening of the present invention can be used for pressurized gases, such as, liquefied natural gas, compressed natural gas (CNG), liquefied petroleum gas (LPG), $CO_2$, $O_2$ and $N_2$.

DESCRIPTION OF THE INVENTION

One of the main objectives of the present invention is to provide a composite material that offers suitable physical-chemical properties for the manufacture of articles that require high resistance and high screening capacity.

One of the main objectives of the present invention is to provide low weight articles with high resistance, storage capacity and accessible cost.

Further, another of the main objectives of the present invention is to provide a material that is suitable for building articles with the purpose of storage for gaseous fluids.

Further, another of the main objectives of the present invention is to provide a process for the production of containers in composite materials for storing liquefied natural gas or similar, comprising a combination of four layers of different materials.

Further, another objective of the present invention is to provide cylinders for storing gases with high screening capacity and that support high pressures.

Further, another objective of the present invention is to provide a coupling to be applied in unions, junctions of composite materials, structural underlying with extremely high mechanical resistance and low weight.

Further, another objective of the present invention is to provide a composite that presents a sum of the characteristics obtained in a bipartite composite structure.

Another objective of the present invention is to provide a group of anchoring blocks to serve as closure and accumulation of physical efforts required in composite materials as well as metallic, with low weight and extremely high resistance with anti-ballistic properties.

Another objective of the present invention is to provide and develop a technology for the production of bipartite couplings in composite and metallic materials for structural closure of hyperstatic frames also in composite.

SUMMARY OF THE INVENTION

The present invention reaches these and other objectives by means of a composite comprising four layers being:
- a first layer of polytetrafluorethylene, which is inner, covered by
- a second layer of high-density polyethylene, adhered to
- a third layer that comprises material selected from: fiber, carbon sheet made of polyacrylonitrile (PAN), lignin immersed in cured epoxy resin from a polymeric matrix containing epoxy and a hardener and a mixture of these and
- a fourth layer of composite being external comprising material selected from: aramid fiber impregnated with a dilating fluid and cured epoxy resin from a polymeric matrix and a hardener and a mixture of these.

Further, the present invention reaches these and other objectives by means of the use of a composite as described above for the manufacture of articles, namely cylinder, coupling, profiles showing high resistance, high storage capacity and high screening capacity.

Further, the present invention reaches these and other objectives by means of articles prepared with a composite according to the above being a cylinder, coupling or profiles.

DETAILED DESCRIPTION OF THE INVENTION

These and other characteristics and additional advantages of the present invention will be better understood with the following detailed description of the invention.

In order to reach the objectives of the present invention, combinations of suitable materials for the preparation of composite materials that presented adequate physical-chemical properties for the manufacture of the articles of interest were studied, presented next. A combination of layers of different materials was developed, which reached the desired properties and offered a safety necessary for the storage of pressurized gases among other characteristics.

The composite material, object of the present invention, comprises four layers adhered together, each one of them with differentiated properties to meet the requirements of a project for the manufacture of articles or objects that require high resistance properties, storage capacity, including for gases and high screening level.

Therefore, the composite material of the present invention comprises a first layer of polytetrafluorethylene being overlaid by a second layer made of high-density polyethylene.

In preferred embodiments, the first and second layer comprised in the composite material of the present invention are prepared according to the patent document BR 10 2015 017549-3 of the same Applicant, which contents are here incorporated by reference.

A third layer present in the composite material of the present invention, which is on one side adhered to the second layer, and on the other side adhered to a fourth layer of composite comprises a material from carbon fiber or carbon sheet made from polyacrylonitrile (PAN) or from lignin and a cured epoxy resin of a polymeric epoxy-hardener matrix, for example, a matrix of diglycidyl bisphenol ether A (DGEBA) and a suitable hardener, such as, an aliphatic amine.

Preferably, in the preferred embodiments of the present invention, a carbon fiber with tension resistance of 3860 MPa and an elasticity modulus of around 226 MPa are used. The third layer provides a structural character to the composite material of the present invention.

The fourth layer of composite, which is the outer layer of the composite material, is adhered to the third layer. The fourth layer comprises filaments of aramid impregnated with dilating fluid and cured epoxy resin from a polymeric epoxy-hardener matrix, for example, a matrix of diglycidyl bisphenol ether A (DGEBA) and a suitable hardener, such as, an aliphatic amine. The aramid fibers used in the present invention have preferably a tension resistance of around 2800 MPa and an elasticity modulus of around 120 GPa. The fourth layer has the purpose of providing screening capacity to the composite articles through the referred composite material.

In the composition of the fourth layer the proportion of dilating fluid for aramid fiber is of around 15 to 30% mass. Preferably, the dilating fluid must be diluted in ethanol, in the proportion of 3 (ethanol) to 1 (dilating fluid). The dilating fluid is formed by the dispersion of nanoparticles of colloidal silica (average diameter varying from around 100 to around 600 nm) in glycol polyethylene (PEG), with molar mass varying from 200 to 400 Daltons). The proportion of the nanoparticles to the PEG should preferably vary from 30% to 60% mass.

The hardener present in the composite material of the present invention may be selected between tetraamine triethylene, and aromatic amides, used alone or mixed.

The composite material of the present invention may be used, for example, for the manufacture of articles such as cylinders. In this case, the third and fourth layers are produced by filament winding of bundles of impregnated fibers and are located over the second layer and over the third layer, respectively, as described above. Thus, there will be a composite cylindrical tube that comprises a first layer of PTFE, a second layer of HDPE, a third layer of carbon fiber or carbon sheet made from polyacrylonitrile (PAN) or lignin and cured epoxy resin, and a fourth layer of aramid fiber impregnated with dilating fluid and cured epoxy resin.

In order to obtain the best set of values that provides the best pressure cylinder from the point of view of the desired mechanical properties, the variables of the process for the manufacture of the layers and of the process of overlaying the layers were examined.

Thus, the present invention refers to articles that are manufactured from the composite of the present invention. Examples of articles that can be prepared from this composite are cylinders, couplings and other profiles that require the properties reached with the composite of the present invention.

Thus, the present invention refers to a coupling for use in unions, junctions in composite materials, structural anchoring with extremely high mechanical resistance and low weight.

This invention presents a unique characteristic as to the application, since the physical efforts required in the composite of the present invention, such as flow and ductility are increased by deformation.

It is known that the joints or couplings to support the efforts such as compression and traction, made from metallic material, react in a known way. The addition of fibers and resins consolidate into another characteristic, such as a union of material, making use of the flow in the accumulation of mechanical efforts.

The metallic alloys present fracture strength, high flow tension, resistance to corrosion. However, this purely mechanical coupling is at a disadvantage as regards weight.

There is an emergence of composite materials, obtained from structural fibers in the form of continuous filament, woven or chopped, impregnated with polymeric, thermoplastic, thermo rigid matrix.

Preferably, the composite of the present invention may comprise numerous structural fibers such as, for example, glass, Kevlar, boron carbide, carbon as structural profiled, as described in the patent document BR PI 0704454-2 A2 or BR 1 0201 501 7549 of the same applicant.

The present invention further refers to the development of a technology for the production of bipartite couplings in composite and metallic materials for structural closure of hyperstatic frames also in composite. In order to reach this objective, it was necessary to manufacture thermoplastic polymeric structure, the profiles, with a high density were manufactured by pultrusion. These profiles are characterized by their structural rigidity.

Therefore, the coupling of the present invention presents high resistance and low weight that consists in molded plate, ribs, structural profiles made from the composite of the present invention being reinforced with high resistance and high density polyethylene with metallic insert, silica-epoxy resins, nanoparticles.

Thus, the coupling comprises resin, fiber and structure welded in metal. Preferably it is prepared with a mold having a thickness of 18 mm to 36 mm. More preferably, it comprises aramid or Kevlar.

Preferably, the coupling of the present invention is made by filament winding.

Further, optionally, each anchoring receives a composite profile (male/female coupling).

To achieve the objectives of the present invention and overcome the deficiencies found in the coupling of the state of the art, these structures were submitted to simulated tests so as to raise and determine the characteristics of the materials available in the market, and parametrize the ones which were subsequently carried out in the structures of the present invention.

Thus, the number of layers of the fibers, the average angle of winding of these layers, the voids content, and the fiber content as well as the thickness of these layers and the structural line were determined.

Providing a highly resistant structure without flow of material and without fragmentation in the maximum rupture tension, providing vast employability in special structures. This vast application contemplates both scaffoldings, grandstands, shelves, and even large modular structures in oil platforms. It refers to a new application in structures in composites for direct application.

Considering these mechanical properties, the techniques for application to the structural reinforcement, as well as the addition of fibers to the metallic mold, the variation of the average winding angle, the layer of material deposited on the profile, were determined.

In preferred embodiments of the present invention, cylinders of the present invention were obtained by a process involving rotomolding, compression molding and filament winding. The cylinders obtained were submitted to hydrostatic tests and to thermal trials, as described as follows.

METHODOLOGY FOR EVALUATING THE STRUCTURAL CHARACTERISTICS OF THE PRESSURE CYLINDERS PREPARED FROM THE COMPOSITE OF THE PRESENT INVENTION

To achieve the objectives of the present invention and overcome the deficiencies or obstacles known from the state of the art, evaluations were carried out in cylinders from the state of the art, a survey of materials available in the market, as well as the determination of the characteristics of these materials and a subsequent parametrization of the performance trials that would be carried out subsequently on the cylinders according to the present invention.

Thus, the number of necessary winding layers, the average winding angle of the layers, the voids content, and the fiber content, as well as the thickness of the layers and of the coating or inner lining were evaluated. These characteristics are essential in any project of pressure flasks and tube manufactured by filament winding. The details of the structural configurations, such as the presence of ribs, the roughness of the coating and the fixation/coupling of the inserts were also evaluated.

Execution of Physical Trials

After obtaining the gas cylinder, one of the categories of the present invention, a sample containing solely the third and fourth layers comprised in the composite of the present invention being used to prepare the cylinder was placed in an oven at a temperature of 500° C. so as to burn the epoxy resin polymeric matrix. Thus, the content of the fibers of the third and fourth layers of the referred composite was determined. This trial method is usual, being normalized by Norm ASTM D3171. The voids content and fiber content and the average winding angle of the layers of the composite of the present invention were determined by digital microscopy. The procedure involved the capture of digital images by optical microscopy or scanning electron microscopy. The voids, in general with sizes larger than those of the fibers, were detailed in less increased images, which could be mounted under the form of a mosaic, covering all the cross section of the sample. This type of extended field image provided a global vision of the sample highly superior to the one provided by individual fields commonly obtained in the traditional microscopy procedure. The voids usually appeared as dark regions and could be segmented by tone. However, there occurred the appearance of other dark regions due to damages caused by the preparation processes.

Thus, apart from the tone, size and form parameters were used as manners to distinguish the voids from other defects. The form analysis resources were also used to discriminate different types of voids. The voids formed in the polymeric matrix usually assumed a circular shape. On the other hand, the voids formed between the fibers were more irregular and could be distinguished from the first, using stretching and convexity measures. This type of analysis, which can only be carried out by means of digital image analysis, provided much more precise quantitative information than the traditional methods of micro structuring characterization.

The analysis of the fibers required, necessarily, another approach. As the fibers and the polymeric matrix are translucid materials, the optical contrast between these two phases was not very accentuated, making the discrimination more difficult. Two alternatives could be employed: the differential acid attack to darken solely the fibers, or an analysis by scanning electron microscopy (SEM), using back scanning electron imaging, which are sensitive to the difference in atomic number between the fibers and polymeric matrix. Each type of image required a specific sequence of processing and analysis. One common difficulty is associated with the regions where the fibers touch. Even without significantly altering the fraction of the area of fibers, this type of contact made the discrimination difficult and, therefore, the individual analysis of each fiber. Different methods of separation of objects were tested. Finally, the parameters such as distribution of diameters and orientation of the fibers were measured.

For obtaining the high-density polyethylene cylinder, the rotomolding method was used. A quantity of high-density polyethylene, which may be in powder form, granules or viscous liquid form, was introduced in a hollow mold and, subsequently the mold was rotated on its main axis at a relatively low speed, under heating until the polyethylene became adhered to the mold surfaces, forming a monolithic layer on the mold surfaces. In a second phase, the cooling of the mold began, maintaining the low rotation until the polyethylene was maintained in the desired form and solidified. Next, the rotation and the cooling were interrupted, and the mold was opened for removal of the molded high-density polyethylene cylinder.

The third layer of the composite of the present invention was formed over the second layer using the winding filament process, and the fourth layer was formed over the third layer, also by the winding filament process.

For manufacturing the third and fourth layers of the composite of the present invention the conventional wet filament winding process in two stages was used.

In the wet filament winding, the mandrel, which is the high-density polyethylene cylinder of the second layer, was submitted to a rotation over its horizontal axis, which the carriage travel moved back and forth horizontally, to receive the fibrous filaments on its surface in programmed winding conditions, after they had been impregnated with a polymeric matrix comprising liquid epoxy resin and hardener. After the mandrel was completely coated up to the desired thickness, the rotation was interrupted, the mandrel was removed and placed in an oven for cure and solidifying of the epoxy resin. The cure and solidification may also be carried out at room temperature.

In the two steps of the filament winding process, winding angles varying from 55° to 95° were tested. The preferred winding angle is of 89°.

The manufactured cylinders were analyzed as to their structural integrity by means of destructive hydrostatic trials.

The cylinders according to the present invention were obtained by the process comprising the following steps:
 a) Preparing a high-density polyethylene (HDPE) cylinder by rotomolding, which comprises the second layer of the composite of the present invention;
 b) Coating the inner surface of the second layer with polytetrafluorethylene forming the first internal layer, by cold compression molding by powder metallurgy in a hydraulic press;
 c) Coating the outer surface of the second layer of high-density polyethylene by filament winding of carbon fiber bundles impregnated with a mixture of polymeric matrix, comprising an epoxy resin and a hardener, and, optionally, nanoparticles forming the third layer of the composite;
 d) Curing and solidifying the epoxy resin of the third layer of composite by heating;
 e) Coating the outer surface of the third layer of the composite comprising carbon fiber or sheet made from polyacrylonitrile (PAN) or lignin by filament winding with aramid fiber bundles impregnated with dilating fluid with a polymeric matrix mixture, comprising an epoxy resin and a hardener, forming the fourth external layer of the composite; and
 f) Curing and solidifying the epoxy resin of the fourth layer of the composite by heating.

Thus, the cylinders were developed by filament winding over an HDPE cylinder, which was coated by a first layer (liner) of thermoplastic polymer (PTFE).

This third and fourth layers of the composite of the present invention manufactured by filament winding of the cylinders are comprised by an epoxy/hardener polymeric matrix and of fibers or sheets, and may further contain, optionally, nanoparticles, or nanocomposites, such as, for example, nanosilicates.

The polymeric matrixes of the third and fourth layers of the composite comprise for each 100 parts, by weight, of epoxy resin, such as diglycidyl bisphenol ether A (DGEBA), from 10 to 20 parts by weight, of a hardener, such as tetraamine tryethylene, and from 0 to 5 parts, by weight, of a load of nanoparticles, such as nanosilicates. In a preferred embodiment, the polymeric matrixes of the third and fourth layers of the composite contain for each 100 parts, by weight, of epoxy resin, such as diglycidyl bisphenol ether A (DGEBA), 13 parts by weight, of hardener, such as tetraamine tryethylene, and 1 part, by weight, of nanosilicate load. The epoxy/hardener system was selected due to their excellent physical and mechanical properties, having a high resistance to corrosion and to humidity. The nanosilicates, although they reduce the permeability of the media, increased the mechanical resistance of the composite material cylinder. The use of carbon fiber or carbon sheet made from polyacrylonitrile (PAN) or lignin, provides higher resistance, increases the storage capacity, and improves the cylinder screening. Additionally, a hybrid composite of the carbon fibers and glass fibers may be used to reduce costs, in this case the fiberglass was used in the longitudinal direction.

Initially, volumetric fractions of around 0.4 to 0.8 of fibers were used and, preferably, of 0.6. In the filament winding stage, preferably, the winding angle was of around 89°.

Cylinder Trials

The tests were carried out in temperature conditions of 25° C. and 100° C., required by the cited norms, for the operational use of pressure flasks.

Optical microscopy trials were also executed as a central technique for image acquisition and scanning electron microscopy (SEM) as a complementary technique. The images were subsequently digitalized from a high-resolution digital camera and quantified by digital processing techniques, such as automatic segmentation, by means of thresholding or border detection.

The results obtained in the trials carried out on the cylinder of the present invention showed that the impregnation of a dilating fluid on the Kevlar layer, overlaid by the carbon and epoxy resin layer in the fourth layer improved surprisingly the storage capacity and the cylinder screening properties, reaching the objectives herein described, and surpassing the disadvantages found in the cylinders of the state of the art.

The preferred embodiments of the invention were described solely as example and small modifications may be made without departing from the scope of the invention.

The invention claimed is:

1. A composite characterized by comprising four layers being:
 a first layer of polytetrafluorethylene, which is inner, covered by
 a second layer of high-density polyethylene, adhered to
 a third layer that comprises colloidal silica nanoparticles and material selected from the group consisting of fiber, carbon sheet made of polyacrylonitrile (PAN), lignin immersed in cured epoxy resin from a polymeric matrix containing epoxy, a hardener, and mixtures thereof, wherein the colloidal silica nanoparticles of the third layer comprise from 30% to 60% by mass polyethylene glycol (PEG); and a fourth layer of composite being external comprising material selected from: aramid fiber impregnated with a dilating fluid and cured epoxy resin from a polymeric matrix and a hardener and a mixture of these.

2. The composite according to claim 1, characterized by the fourth layer comprising a proportion of dilating fluid to aramid fiber varying from 15 to 30% in mass.

3. The composite according to claim 1, characterized by the dilating fluid being ethanol, in a proportion of 3 parts of ethanol to 1 part of dilating fluid.

4. The composite according to claim 1, characterized by the third and fourth layer comprising, for each 100 parts, in mass, of epoxy resin, from 10 to 20 parts, in mass, of hardener, and from 0 to 5 parts in mass, of a nanoparticle load.

5. The composite according to claim 1, characterized by the third layer comprising a mixture of carbon fiber or sheet and fiberglass, a cured epoxy resin from a polymeric matrix/hardener and nanosilicates.

6. The use of a composite as defined in claim 1, characterized by being for the manufacture of articles being cylinder, coupling, profiles providing high resistance, high storage capacity and high screening capacity.

7. An article characterized by being prepared with a composite as defined in claim 1, being a cylinder, coupling or profiles.

8. An article according to claim 7, characterized by being used to contain pressurized gases selected among liquefied natural gas, compressed natural gas (CNG), liquefied petroleum gas (LPG), $CO_2$, $O_2$, $N_2$.

* * * * *